US010992175B2

(12) United States Patent
Warren et al.

(10) Patent No.: US 10,992,175 B2
(45) Date of Patent: Apr. 27, 2021

(54) COMMUNICATION CIRCUIT FOR 2-WIRE PROTOCOLS BETWEEN HVAC SYSTEMS AND SMART-HOME DEVICES

(71) Applicant: Google LLC, Mountain View, CA (US)

(72) Inventors: Daniel Adam Warren, San Francisco, CA (US); Eric Marschalkowski, Inning (DE); Nathan Lentz, Sacramento, CA (US); Timothy Lai, San Francisco, CA (US)

(73) Assignee: Google LLC, Mountain View, CA (US)

( * ) Notice: Subject to any disclaimer, the term of this patent is extended or adjusted under 35 U.S.C. 154(b) by 370 days.

(21) Appl. No.: 16/010,271

(22) Filed: Jun. 15, 2018

(65) Prior Publication Data

US 2019/0384334 A1 Dec. 19, 2019

(51) Int. Cl.
*H02J 13/00* (2006.01)
*H02J 1/06* (2006.01)
*G05F 1/614* (2006.01)

(52) U.S. Cl.
CPC .......... *H02J 13/00016* (2020.01); *H02J 1/06* (2013.01); *H02J 13/00004* (2020.01); *G05F 1/614* (2013.01); *H02J 2310/14* (2020.01)

(58) Field of Classification Search
CPC .......... H02J 1/06; H02J 3/14; H02J 13/00004; H02J 13/00016; H02J 2310/14; H02J 2310/52; G05F 1/613–614
See application file for complete search history.

(56) References Cited

U.S. PATENT DOCUMENTS

| | | |
|---|---|---|
| 4,528,459 A | 7/1985 | Wiegel |
| 4,898,229 A | 2/1990 | Brown et al. |
| 4,948,040 A | 8/1990 | Kobayashi et al. |
| 5,065,813 A | 11/1991 | Berkeley et al. |
| 5,107,918 A | 4/1992 | McFarlane et al. |
| 5,161,606 A | 11/1992 | Berkeley et al. |
| 5,181,389 A | 1/1993 | Hanson et al. |
| 5,251,813 A | 10/1993 | Kniepkamp |

(Continued)

OTHER PUBLICATIONS

International Search Report and Written Opinion dated Oct. 7, 2019 in International Patent Application No. PCT/US2019/037268, all pages.

(Continued)

*Primary Examiner* — Fred E Finch, III
(74) *Attorney, Agent, or Firm* — Kilpatrick Townsend & Stockton LLP

(57) ABSTRACT

A circuit for stealing power from an external system without interfering with a communication protocol includes a plurality of wiring connectors configured to receive a plurality of wires, where the plurality of wiring connectors receive a plurality of current levels set by the external system according to the communication protocol; a first voltage regulator to regulate a voltage on the plurality of wiring connectors at a plurality of voltage levels according to the communication protocol; a current monitor to measure the plurality of current levels received through the plurality of wiring connectors; a second voltage regulator that provides a current-limiting output; and a power converter that optimizes an amount of power stolen from the plurality of wiring connectors based on the current-limiting output.

18 Claims, 12 Drawing Sheets

(56) References Cited

U.S. PATENT DOCUMENTS

| | | |
|---|---|---|
| 5,381,950 A | 1/1995 | Aldridge |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,570,837 A | 11/1996 | Brown et al. |
| 5,595,342 A | 1/1997 | McNair et al. |
| 5,611,484 A | 3/1997 | Uhrich |
| 5,635,896 A | 6/1997 | Tinsley et al. |
| 5,646,349 A | 7/1997 | Twigg et al. |
| 5,655,709 A | 8/1997 | Garnett et al. |
| 5,808,294 A | 9/1998 | Neumann |
| 5,918,474 A | 7/1999 | Khanpara et al. |
| 5,950,709 A | 9/1999 | Krueger et al. |
| 6,089,310 A | 7/2000 | Toth et al. |
| 6,102,749 A | 8/2000 | Lynn et al. |
| 6,213,404 B1 | 4/2001 | Dushane et al. |
| 6,315,211 B1 | 11/2001 | Sartain et al. |
| 6,336,593 B1 | 1/2002 | Bhatnagar |
| 6,356,038 B2 | 3/2002 | Bishel |
| 6,513,723 B1 | 2/2003 | Mueller et al. |
| 6,622,925 B2 | 9/2003 | Carner et al. |
| 6,623,311 B1 | 9/2003 | Dehan |
| 6,798,341 B1 | 9/2004 | Eckel et al. |
| 6,851,621 B1 | 2/2005 | Wacker et al. |
| 6,851,967 B2 | 2/2005 | Miyoshi et al. |
| 6,956,463 B2 | 10/2005 | Crenella et al. |
| 6,997,390 B2 | 2/2006 | Alles |
| 7,055,759 B2 | 6/2006 | Wacker et al. |
| 7,083,109 B2 | 8/2006 | Pouchak |
| 7,156,318 B1 | 1/2007 | Rosen |
| 7,167,079 B2 | 1/2007 | Smyth et al. |
| 7,174,239 B2 | 2/2007 | Butler et al. |
| 7,181,317 B2 | 2/2007 | Amundson et al. |
| 7,360,370 B2 | 4/2008 | Shah et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,562,536 B2 | 7/2009 | Harrod et al. |
| 7,571,865 B2 | 8/2009 | Nicodem et al. |
| 7,634,504 B2 | 12/2009 | Amundson |
| 7,648,077 B2 | 1/2010 | Rossi et al. |
| 7,673,809 B2 | 3/2010 | Juntunen |
| 7,748,640 B2 | 7/2010 | Roher et al. |
| 7,775,452 B2 | 8/2010 | Shah et al. |
| 7,841,542 B1 | 11/2010 | Rosen |
| 7,844,764 B2 | 11/2010 | Williams |
| 7,847,681 B2 | 12/2010 | Singhal et al. |
| 7,900,849 B2 | 3/2011 | Barton et al. |
| 8,067,912 B2 | 11/2011 | Mullin |
| 8,091,375 B2 | 1/2012 | Crawford |
| 8,659,320 B2 | 2/2014 | Warren |
| 9,568,201 B2 | 2/2017 | Fadell et al. |
| 2003/0037555 A1 | 2/2003 | Street et al. |
| 2003/0090243 A1 | 5/2003 | Atherton |
| 2004/0130454 A1 | 7/2004 | Barton |
| 2004/0164238 A1 | 8/2004 | Xu et al. |
| 2004/0193324 A1 | 9/2004 | Hoog et al. |
| 2004/0238651 A1 | 12/2004 | Juntunen et al. |
| 2005/0040250 A1 | 2/2005 | Wruck |
| 2005/0043907 A1 | 2/2005 | Eckel et al. |
| 2005/0145705 A1 | 7/2005 | Shah et al. |
| 2005/0150967 A1 | 7/2005 | Chapman et al. |
| 2005/0159846 A1 | 7/2005 | Van Ostrand et al. |
| 2005/0270151 A1 | 12/2005 | Winick |
| 2006/0186214 A1 | 8/2006 | Simon et al. |
| 2007/0045432 A1 | 3/2007 | Juntunen |
| 2007/0045441 A1 | 3/2007 | Ashworth et al. |
| 2007/0095082 A1 | 5/2007 | Garrett et al. |
| 2007/0105252 A1 | 5/2007 | Lee et al. |
| 2007/0131787 A1 | 6/2007 | Rossi et al. |
| 2007/0132503 A1 | 6/2007 | Nordin |
| 2007/0157639 A1 | 7/2007 | Harrod |
| 2007/0183475 A1 | 8/2007 | Hutcherson |
| 2007/0208461 A1 | 9/2007 | Chase |
| 2007/0221741 A1 | 9/2007 | Wagner et al. |
| 2007/0228183 A1 | 10/2007 | Kennedy et al. |
| 2007/0241203 A1 | 10/2007 | Wagner et al. |
| 2008/0006708 A1 | 1/2008 | Gauger et al. |
| 2008/0015742 A1 | 1/2008 | Kulyk et al. |
| 2008/0054082 A1 | 3/2008 | Evans et al. |
| 2008/0094010 A1 | 4/2008 | Black |
| 2008/0128523 A1 | 6/2008 | Hoglund et al. |
| 2008/0161977 A1 | 7/2008 | Takach et al. |
| 2009/0057425 A1 | 3/2009 | Sullivan et al. |
| 2009/0099697 A1 | 4/2009 | Li et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0194601 A1 | 8/2009 | Flohr |
| 2009/0236433 A1 | 9/2009 | Mueller et al. |
| 2009/0259713 A1 | 10/2009 | Blumrich et al. |
| 2010/0006660 A1 | 1/2010 | Leen et al. |
| 2010/0070099 A1 | 3/2010 | Watson et al. |
| 2010/0076605 A1 | 3/2010 | Harrod et al. |
| 2010/0084482 A1 | 4/2010 | Kennedy et al. |
| 2010/0114382 A1 | 5/2010 | Ha et al. |
| 2010/0131112 A1 | 5/2010 | Amundson et al. |
| 2010/0163635 A1 | 7/2010 | Ye |
| 2010/0182743 A1 | 7/2010 | Roher |
| 2010/0193592 A1 | 8/2010 | Simon et al. |
| 2010/0298985 A1 | 11/2010 | Hess et al. |
| 2011/0141782 A1* | 6/2011 | Sells ............... H02M 7/219 |
| | | 363/127 |
| 2011/0253796 A1 | 10/2011 | Posa et al. |
| 2012/0017611 A1 | 1/2012 | Coffel et al. |
| 2012/0248211 A1 | 10/2012 | Warren et al. |
| 2012/0268085 A1* | 10/2012 | Lee ................. H02M 3/158 |
| | | 323/234 |
| 2013/0221117 A1 | 8/2013 | Warren et al. |
| 2014/0031992 A1 | 1/2014 | Bergman |
| 2014/0041846 A1 | 2/2014 | Leen et al. |
| 2014/0088776 A1* | 3/2014 | Brandt ............. H01H 47/22 |
| | | 700/295 |
| 2014/0321160 A1 | 10/2014 | Novotny et al. |
| 2014/0368036 A1* | 12/2014 | Houde .............. H02M 1/08 |
| | | 307/31 |
| 2016/0018836 A1* | 1/2016 | Pawar .............. F24F 11/62 |
| | | 700/276 |
| 2016/0252264 A1 | 9/2016 | Vogel et al. |
| 2019/0056131 A1* | 2/2019 | Warren ............. F24F 11/52 |
| 2020/0028386 A1* | 1/2020 | Sexton ............. H02J 50/001 |

OTHER PUBLICATIONS

Written Opinion of the International Preliminary Examining Authority dated Mar. 10, 2020 in International Patent Application No. PCT/US2019/037268, 4 pages.

* cited by examiner

COMMUNICATION CIRCUIT FOR 2-WIRE PROTOCOLS BETWEEN HVAC SYSTEMS AND SMART-HOME DEVICES

CROSS REFERENCES TO RELATED APPLICATIONS

This application is related to U.S. Pat. No. 9,568,201, entitled "Environmental Control System Retrofittable with Multiple Types of Boiler-Based Heating Systems," which is hereby incorporated by reference for all purposes.

TECHNICAL FIELD

This patent specification relates generally to communication between an actuator device for a boiler-based HVAC system and the boiler itself. More specifically, this disclosure describes circuits and methods for enabling devices powering, power stealing, and communication between the boiler and the actuator device to maintain compatibility with predetermined thresholds.

BACKGROUND

In certain situations, it may be beneficial to have a thermostat located a distance away from a location at which connection to heating, ventilation, and air conditioning (HVAC) control wires are accessible. For instance, HVAC control wires may be run from an HVAC system, behind a wall, and exposed in an inconvenient location, such as within a utility closet. Such a location may not be convenient to be accessed by a user or such a location may not be ideal for accurately sensing the temperature of a region of the structure in which occupants are typically present. Furthermore, when an actuator for controlling a boiler system and/or a thermostat are located away from the HVAC system, power for these devices may not be readily available.

BRIEF SUMMARY

In some embodiments, a circuit for stealing power from an external system without interfering with a communication protocol may include a plurality of wiring connectors configured to receive a plurality of wires. The plurality of wiring connectors may receive a plurality of current levels set by the external system according to the communication protocol. The circuit may also include a first voltage regulator to regulate a voltage on the plurality of wiring connectors at a plurality of voltage levels according to the communication protocol. The circuit may additionally include a current monitor to measure the plurality of current levels received through the plurality of wiring connectors, and a second voltage regulator that provides a current-limiting output. The circuit may further include a power converter that optimizes an amount of power stolen from the plurality of wiring connectors based on the current-limiting output.

In some embodiments, a method for stealing power from an external system without interfering with a communication protocol may include receiving a plurality of current levels set by the external system according to the communication protocol, where the plurality of current levels may be received through a plurality of wiring connectors configured to receive a plurality of wires. The method may also include regulating a voltage on the plurality of wiring connectors at a plurality of voltage levels according to the communication protocol using a first voltage regulator. The method may additionally include measuring the plurality of current levels received through the plurality of wiring connectors using a current monitor, and providing a current-limiting output from a second voltage regulator. The method may further include optimizing an amount of power stolen from the plurality of wiring connectors by a power converter based on the current-limiting output.

In any embodiments, one or more of the following features may be included in any combination and without limitation. The circuit may also include a bridge rectifier coupled between the plurality of wiring connectors and the first voltage regulator. The bridge rectifier may include a diode bridge rectifier. The bridge rectifier may include a FET bridge rectifier with Zener-resistor clamps at FET gates. The first voltage regulator may include a plurality of the Zener diode clamps, where regulated voltages of the plurality of Zener diode clamps may correspond to the plurality of voltage levels. The current monitor may include a resistor and a current-sense amplifier that measures a voltage differential across the resistor. The circuit may also include a resistive network coupled to the first voltage regulator and a switch controlled by a transmit signal from a processor, where the switch may change a resistance of the resistive network to control a regulated voltage output by the first voltage regulator. The circuit may also include a resistive network coupled to the second voltage regulator and a switch controlled by a transmit signal from a processor, where the switch may change a resistance of the resistive network to control a regulated voltage output by the second voltage regulator. The power converter may include an error amplifier that controls an output current of the power converter. The current-limiting output from the second voltage regulator may drop in voltage when the second voltage regulator drops out, thereby causing the power converter to use less current. Optimizing the amount of power stolen may include reducing an amount of power output by the power converter when the current-limiting output indicates that the second voltage regulator is dropping out. Optimizing the amount of power stolen may include reducing an amount of power output by the power converter when the current-limiting output indicates that the second voltage regulator is not dropping out. The method may also include decoding the plurality of current levels measured by the current monitor to determine a message sent from the external system. The method may also include encoding a message to be sent to the external system in the plurality of voltage levels. The method may also include receiving a command from a smart-home device to send the message to the external system. The method may also include using the power stolen by the power converter to power a system processor. The method may also include using the power stolen by the power converter to charge a rechargeable energy-storage device. The method may also include using the power stolen by the power converter to power a system processor. The external system may include an HVAC system comprising a boiler.

A further understanding of the nature and advantages of the present invention may be realized by reference to the remaining portions of the specification and the drawings. Also note that other embodiments may be described in the following disclosure and claims.

DETAILED DESCRIPTION

Figure 1:
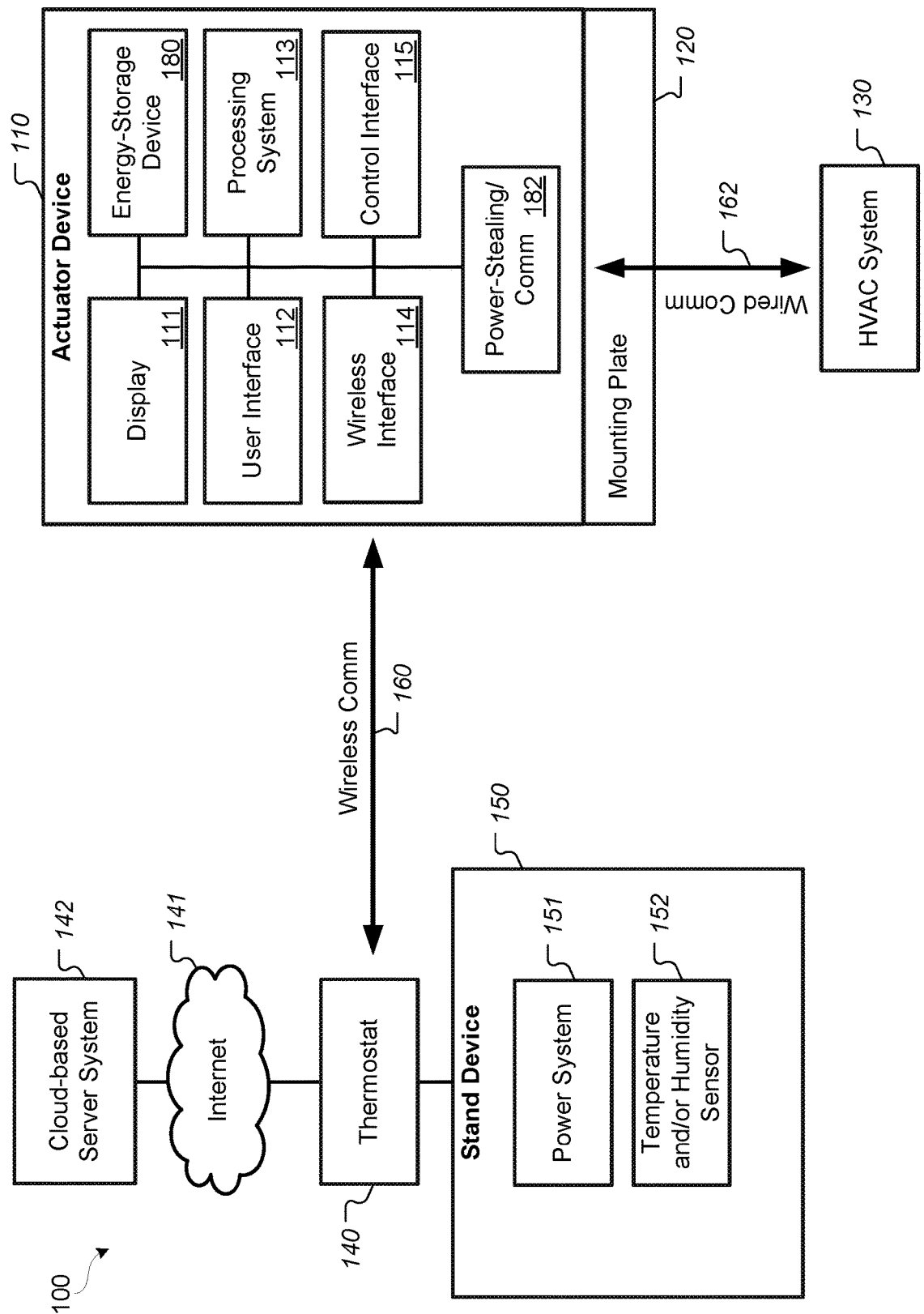
FIG. 1 illustrates an embodiment of a block diagram of a HVAC control system that includes a stand device and an actuator device.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

An actuator device (referred to as an "actuator") may be connected with HVAC control wires. Such HVAC control wires may control operation of various HVAC components, including: a furnace, a boiler, a fan, an air conditioner, and/or a multi-stage heating or cooling system. The actuator unit may open and close circuits in order to control operation of components of the HVAC system. So as not to require an external power connection, the actuator unit may steal power from the HVAC system over the same wires used for communication with and control of the HVAC system. In order to not disrupt the communication protocol, the actuator may include a first voltage regulator that regulates an output voltage according to a transmit signal provided by the actuator. A current monitor can be placed in series with the first voltage regulator to measure the input current and decode a received signal. The output of the current monitor can be fed into a second voltage regulator that operates on the edge of its dropout mode. By receiving the transmit input provided to the first voltage regulator, the second voltage regulator can follow the output of the first regulator and provide a current limit signal to a system power converter. As the current limit signal increases proportional to an amount of current shunted through a resistive path, the system power converter can increase the amount of current stolen from the communication signal at the output of the current monitor to power the actuator and/or charge a rechargeable energy-storage device. As the current stolen by the system power converter reaches a maximum, the second regulator may enter its dropout mode, causing the system power converter to decrease the amount of current it steals. This feedback loop allows the system to steal the maximum out of current possible without interfering with the communication protocol.

Embodiments detailed herein are focused on various communication aspects between the actuator and the HVAC system. Such aspects can improve the efficiency and reliability with which the actuator can communicate and receive power from the HVAC system. It is to be appreciated that while one or more embodiments are described further herein in the context of a typical HVAC system used in a residential home, such as a single-family residential home, the scope of the present teachings is not so limited. More generally, intelligent thermostat systems according to one or more of the embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Additionally, the communication between the HVAC system and the actuator is merely provided by way of example, and not meant to be limiting. The 2-wire communication techniques coupled with power stealing circuitry described herein can be used in any device communicating by way of a wired communication channel. Therefore, the actuator and the boiler control described below can be readily substituted for any master/slave communication devices where one device powers the other over the same channel. This includes any smart home device, such as hazard detectors, security system sensors, smart doorbells, cameras, child monitors, wearable technology, smart home assistants, microphones, speakers, smart appliances, televisions, and so forth.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

While embodiments detailed herein are focused on communication between actuators and HVAC systems, it should be understood that the embodiments detailed herein may be applicable to other smart home devices and/or sensor devices. For instance, aspects of the communication circuits described below may be applied to thermostats, smoke detectors, carbon monoxide detectors, doorbells, home assistants, video cameras, remote temperature sensors, or other smart devices that may be installed in a home, office, or other location.

FIG. 1 illustrates an embodiment of a block diagram of an HVAC control system 100 that includes an actuator 110, according to some embodiments. Specifically, the HVAC control system 100 may include the actuator 110, a mounting plate 120, a thermostat 140, and a stand device 150. The actuator 110 may be attached to a mounting plate 120. The mounting plate 120 may facilitate the actuator device 110 being attached to a surface (e.g., a wall) and/or allowing HVAC control wires to be routed into a back of the actuator device 110 through a wired communication channel 162. For example, a pair of HVAC control wires may be exposed through a surface of a wall. The mounting plate 120 may allow the actuator 110 to be secured to the surface of the wall while allowing HVAC control wires to be passed through a rear surface of the actuator 110. The actuator device 110 may be connected via one or more HVAC control wires to the HVAC system 130 based on the existing wiring of the HVAC system 130.

In some embodiments, the HVAC system 130 may include a boiler-based HVAC system. For example, the HVAC system 130 may include a boiler device that includes a control interface with a wired communication port that may be coupled to, for example, the wired communication channel 162 with the actuator 110. As described below, the boiler device can provide power through the wired communication channel 162 to the actuator 110. The actuator 110 may include a rechargeable energy storage device 180, such as a super capacitor or a rechargeable battery. A power-stealing and communication circuit 182 in the actuator 110 can "steal" power from the boiler device through the wired communication channel 162 to provide operating power to the actuator 110 and/or recharge the energy storage device 180. Additionally, the actuator 110 and the boiler device may communicate with each other over the wired communication channel 162 using a 2-wire communication channel protocol, such as OpenTherm®.

The actuator device 110 may include a display 111, a user interface 112, a processing system 113, a wireless interface 114, and a control interface 115. The display 111, which may include one or more LEDs or other forms of lighting elements, an active display, an LCD display, a color display, and/or the like, may present information to a user regarding the operation of the actuator device 110, the status of the wired communication channel 162, the status of a wireless communication channel 160, and/or any other operational information. The display 111 may include a "dead front" display; such a display may appear to be a blank surface that is difficult to identify as a display when the one or more lighting elements are inactive. When active, the lighting elements may be visible on the blank surface. The user interface 112 may include one or more buttons or other forms of user input devices that allow a user to provide input directly to the actuator 110. For instance, the user interface 112 may be used to engage one or more components of the HVAC system 130 without a user being required to interact with the thermostat 140. The processing system 113 may include one or more processors that send/receive information via a wireless interface 114 to the thermostat 140. The processing system 113 may receive input from the user interface 112, output information that is presented via the display 111, and control actuation of various HVAC components and functions via the control interface 115. The wireless interface 114 may use one or more wireless communication protocols, such as: Wi-Fi® (IEEE 802.11), IEEE 802.15.4, Bluetooth®, Z-Wave®, ZigBee®, Thread®, or any other wireless communication protocol to communicate with the thermostat 140. Control interface 115 may open and close circuits that include HVAC control wires based on instructions from processing system 113 to control HVAC system 130.

The thermostat 140 may wirelessly communicate with the actuator 110 via the wireless communication channel 160. The thermostat 140 may transmit instructions, through one of the wireless communication protocols described above to instruct the actuator 110 to activate or deactivate one or more components of the HVAC system 130. The thermostat 140 may be removably coupled with a stand 150. The thermostat 140 may communicate via a wireless network (e.g., a Wi-Fi WLAN) with the Internet 141. Via the Internet 141, the thermostat 140 may transmit data to and receive data from a cloud-based server system 142. The cloud-based server system 142 may maintain a user account that stores data related to the thermostat 140 and may permit a user to remotely control and/or view data related to the thermostat 140. For example, a user may communicate with the cloud-based server system 142 to modify a setpoint schedule implemented by the thermostat 140 or may provide a real-time setpoint that is used to immediately control the HVAC system 130 by the thermostat 140 through the actuator 110.

The stand 150 may be placed on a surface and may include a power system 151 that powers the thermostat 140. The power system 151 may be connected to a power outlet (e.g., 120 V, 230 V) and may provide a constant voltage to thermostat 140. The stand 150 may have one or more on-board temperature sensors, such as a temperature and/or humidity sensor 152, that provides temperature and/or humidity measurements to thermostat 140.

Figure 2:
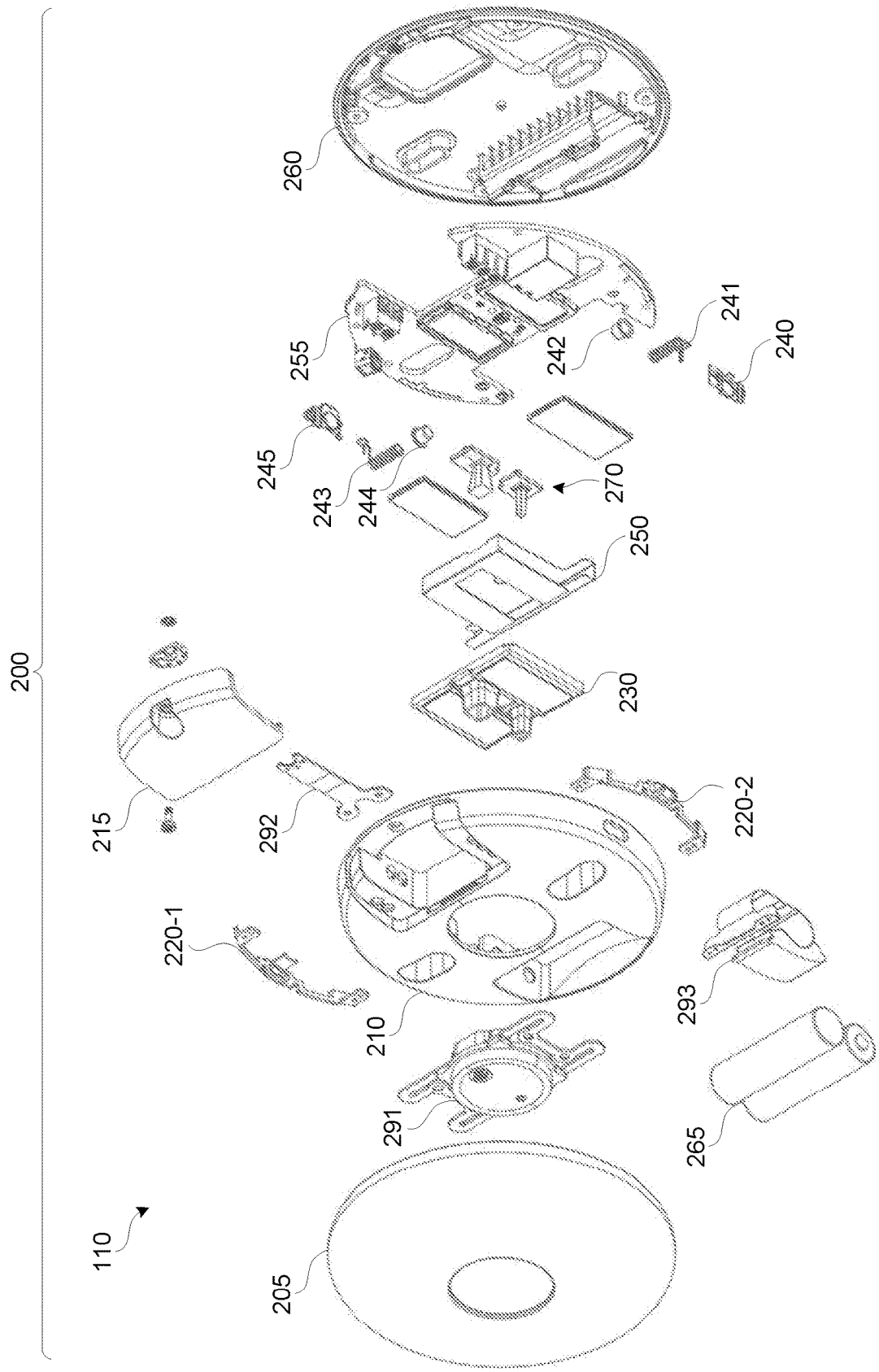
FIG. 2 illustrates an exploded front view of an embodiment of an actuator device.

FIG. 2 illustrates an exploded view of an actuator 110, according to some embodiments. The actuator 110 may include a rotatable cover assembly 205, a chassis 210, an HVAC wiring connector cover 215, cover fastener assemblies 220 (220-1, 220-2), a light boot assembly 230, a battery contact 240, a battery spring 241, a spring cap 242, a battery spring 243, a spring cap 244, a battery contact 245, a support 250, a printed circuit board (PCB) 255, a backplate 260, batteries 265; a light pipe assembly 270 (which may include multiple light pipes and the structure to which the light pipes are attached), a battery holder tab 293, a button 291, and a cover leash 292 The rotatable cover assembly 205 may be designed to be facing away from a surface to which the backplate 260 is mounted. As such, the rotatable cover assembly 205, when removably attached with the chassis 210, may be the component of the actuator 110 that is most visible to a user. The rotatable cover assembly 205 may be removable by a user, for example, by pulling on the edges of the rotatable cover assembly 205. Removing the rotatable cover assembly 205 can allow a user to access the HVAC wiring connectors and/or the battery compartment of the chassis 210. The PCB 255 may have components such as a wireless interface (e.g., wireless interface 114) and a processing system (e.g., processing system 113) mounted to it.

Figure 3B:
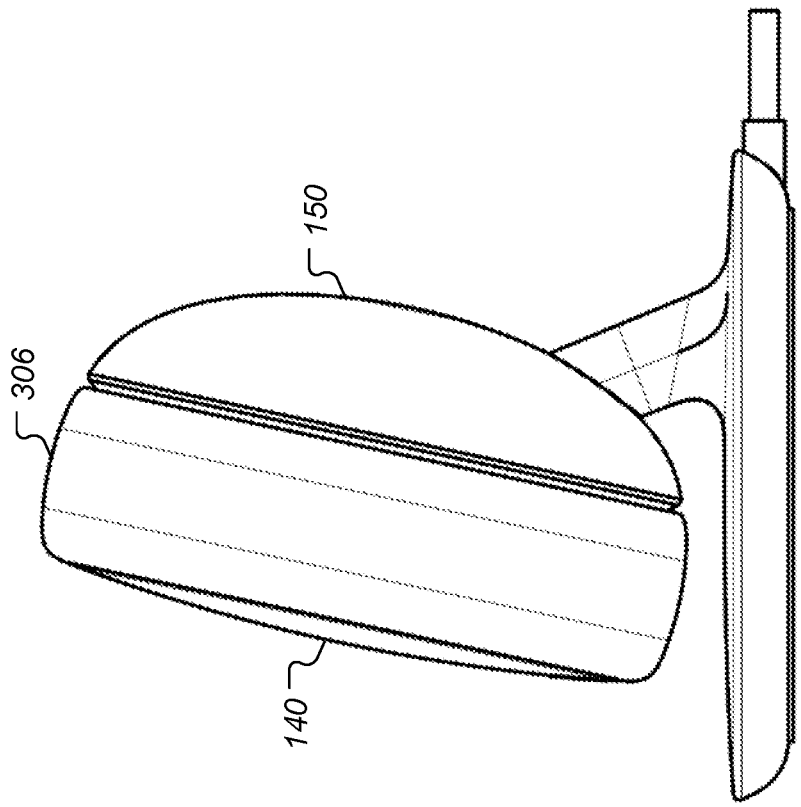
FIG. 3B illustrates a side view of an embodiment of a thermostat attached to a stand device.
Figure 3A:
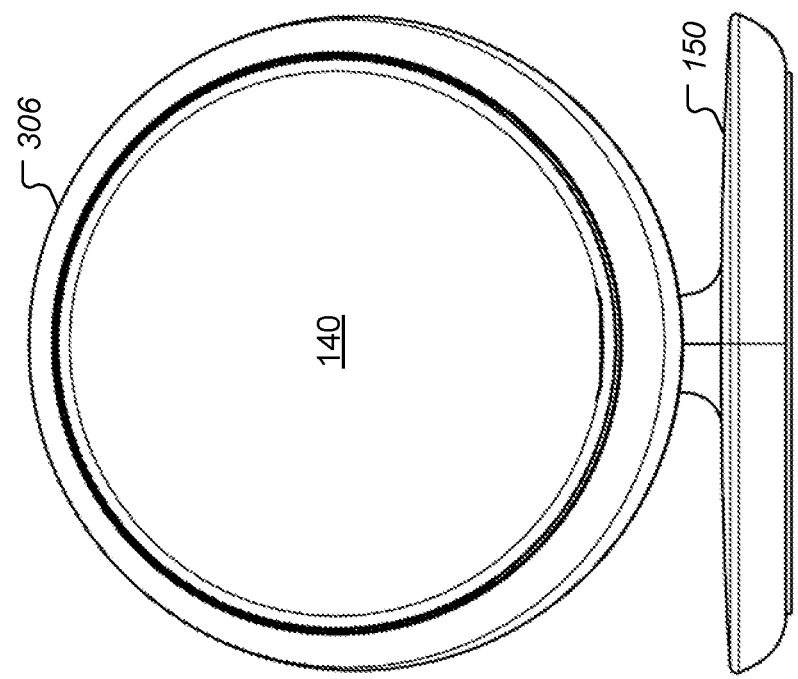
FIG. 3A illustrates a front view of an embodiment of a thermostat attached to a stand device.

FIGS. 3A and 3B illustrate views of a thermostat 140 attached to a stand 150. FIG. 3A illustrates a front view of the thermostat 140 attached to the stand 150, while FIG. 3B illustrates a side view of the thermostat 140 attached to the stand 150. The stand 150 may permit the thermostat 140 to be powered and to be supported on a flat surface (e.g., table, shelf, desk, floor, etc.). The thermostat 140 may be cylindrical and may have an outer ring that rotates. Ring 306 may match a contour of the stand 150.

Figure 4:
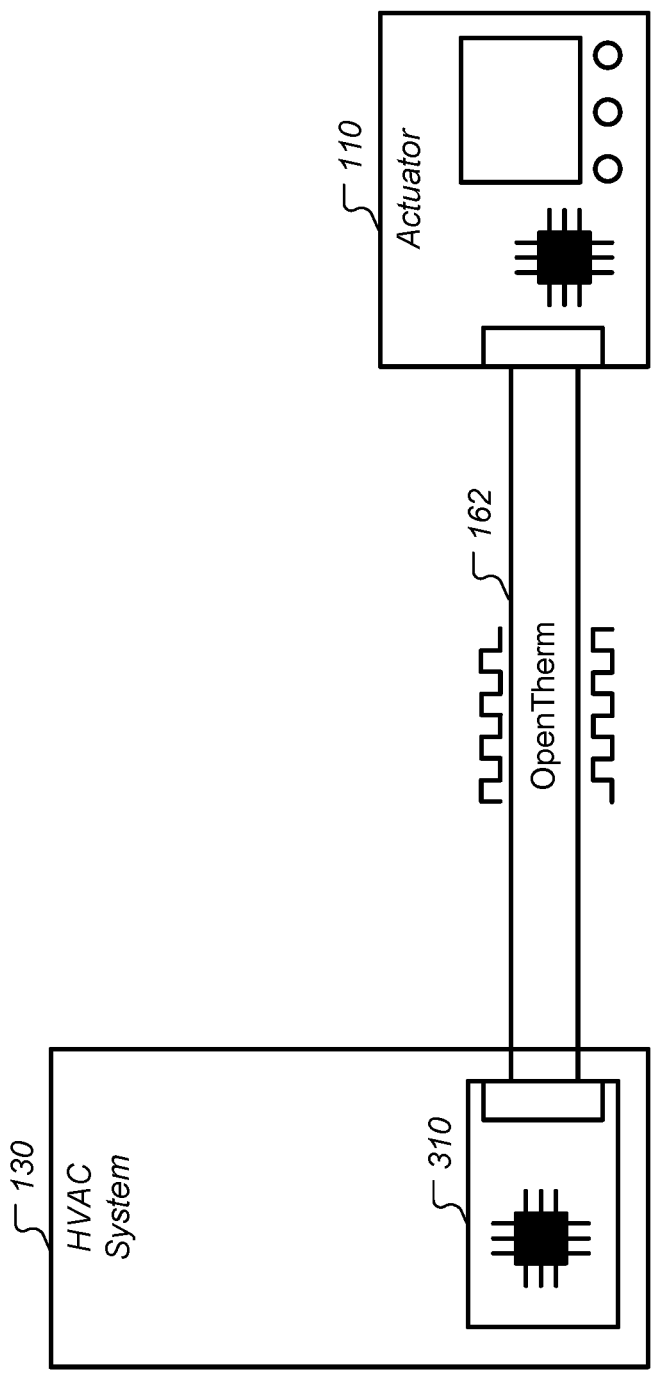
FIG. 4 illustrates a detailed view of the wired communication channel between the HVAC system and the actuator, according to some embodiments.

FIG. 4 illustrates a detailed view of the wired communication channel 162 between the HVAC system 130 and the actuator 110, according to some embodiments. In this example, the HVAC system 130 may include a boiler having a boiler control 310. The boiler control 310 may include a 2-wire interface for communicating with the actuator 110. In some embodiments, the boiler control 310 can pass a simple voltage signal through one wire to the actuator 110. The actuator 110 can control the operation of a relay that connects two of the wires in the wired communication channel 162. For example, closing the relay may cause two of the wires in the wired communication channel 162 to be shorted together, which may in turn cause the boiler control 310 to activate a function of the HVAC system 130, such as turning on the boiler, causing the boiler to circulate heated fluid through the smart-home environment, and so forth.

In some embodiments, more complex communication protocols may be used over the wired communication channel 162. Most 2-wire communication protocols communicate by virtue of controlling the state of the voltage and/or current on the wired communication channel 162. Protocols may govern the rise/fall times, voltage thresholds for high and low states, current thresholds for high and low states, frequency of transactions, and so forth. Therefore, the voltage, current, and/or timing of any signals that are propagated on the wired communication channel 162 may need to be tightly controlled to prevent interference with the communication signal.

The specificity of most 2-wire communication protocols presents a technical problem for using the wired communication channel 162 to provide operating power for the actuator 110. In some embodiments, the actuator 110 may be co-located with the boiler control 310 and may receive direct line power through additional power wires that can be included in the wired communication channel 162. However, other embodiments may support configurations where the actuator 110 is not co-located with the boiler control 310. Instead, the actuator 310 can be located in another part of the smart-home environment, such as on a different floor, in a different room, more than 15 feet away, etc. In these configurations, the actuator 110 might only have access to wires specifically dedicated to communication and not have access to wires specifically dedicated to providing line power.

Prior to this disclosure, the actuator 110 would require an external power source, such as a line voltage connection, a USB cable, a plug into a wall outlet, and so forth. However, requiring an external power source would cause users to need to wire the actuator 110 to both the boiler control 310 and to the external power source separately. This not only led to wiring errors due to the number of connections that needed to be made, but often prevented users from locating the actuator 110 in an ideal position, opting instead to locate the actuator 110 close to the external power source. From a technical perspective, the actuator 110 was completely dependent upon the external power source, thus, when power outages occurred, the actuator 110 would lose power and the user would not be able to control the HVAC system 130 without installing backup batteries.

Figure 5:
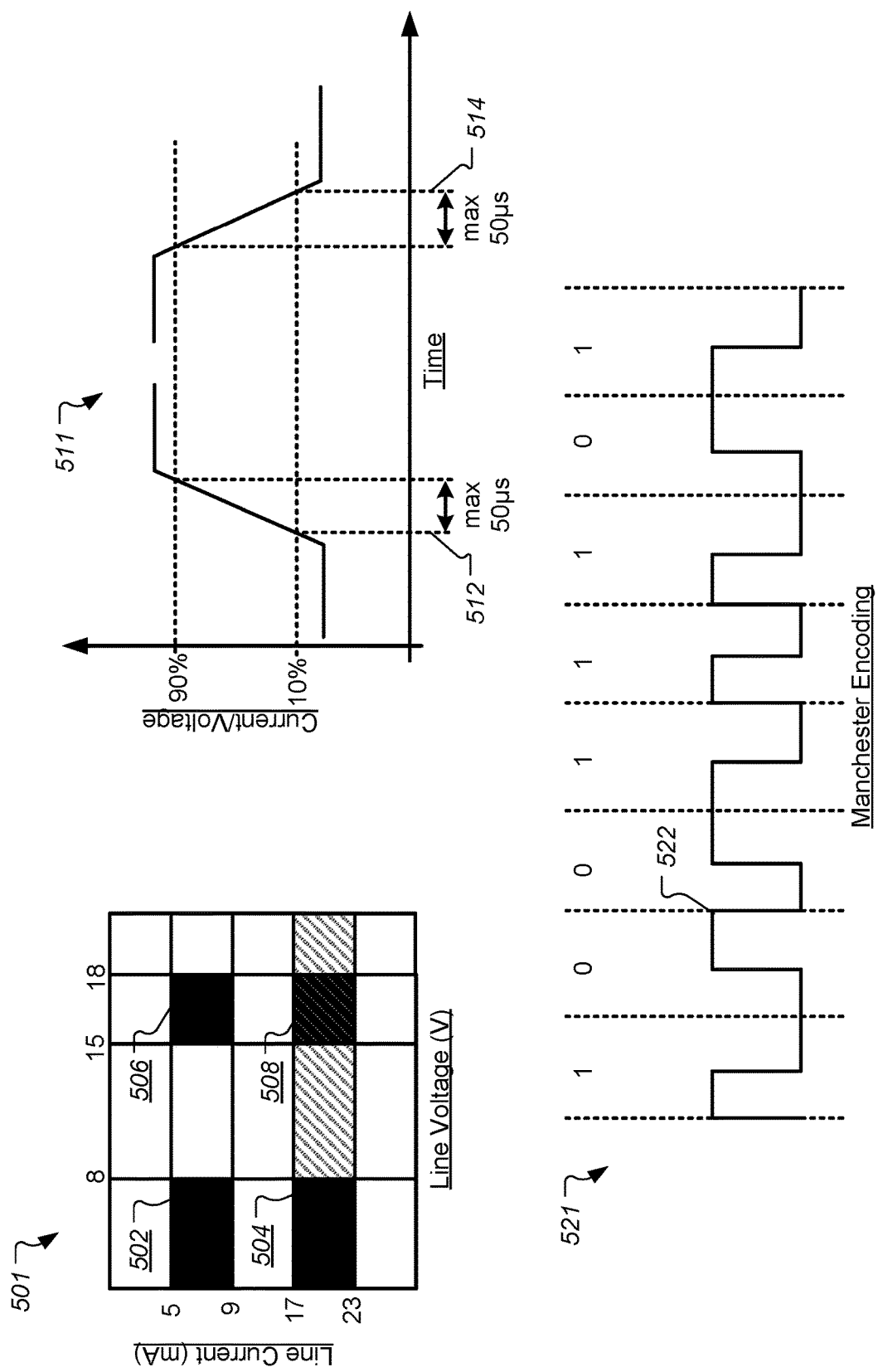
FIG. 5 illustrates some of the operating characteristics of one communication protocol.

This technical problem can be further understood by examining one of the more popular 2-wire protocols that can be used to communicate between the boiler control 310 and the actuator 110. FIG. 5 illustrates some of the operating characteristics of the OpenTherm® communication protocol. This protocol is based on two current signaling levels that are set by the boiler control 310 and two voltage signaling levels that are set by the actuator 110. Graph 501 in FIG. 5 illustrates the different voltage/current levels that can be used to transmit encoded digital signals over the wired communication channel 162. Note that the voltage/current levels are specific to the OpenTherm® communication protocol, and that other protocols may use different voltage/current levels that would be well within the scope of this invention. In this protocol, the standard specifies low and high signal level ranges for both line voltage and line current, where transitions between signal levels correspond to binary data encodings. In some embodiments, the boiler control 310 may include a current source that can be used to set the line current on the wired communication channel 162. When outputting a low-current level, the line current can reside in state 502 or 506 in graph 501. When outputting a high-current level, the line current can reside in state 504 or 508 in graph 501, corresponding to between 17 mA and 23 mA. The actuator 110 can read the value of the current that is set by the boiler control 310, and interpret the state transitions to decode a binary message from the boiler control 310.

In a similar fashion, the actuator 110 can control the voltage on the wired communication channel 162 in order to send encoded binary communications to the boiler control 310. For example, the actuator 110 may include a current sink that can be used to set the voltage on the wired communication channel 162. A low-voltage level can fall within state 502 or state 504 in graph 501 corresponding to a voltage range of between 0 V and 8 V. A high voltage-level can fall within state 506 or 508 on graph 501 corresponding to a voltage range of between 15 V and 18 V. This system allows the wired communication channel 162 to function by sending current signals from the boiler control 310 to the actuator 110, and voltage signals in the reverse direction from the actuator 110 to the boiler control 310.

In some embodiments, the physical idle state of the line may be a low-power consumption state using low voltage and low current, such as state 502. Some embodiments may hold the line current low when the voltage is used by the actuator 110 for signaling to reduce power consumption. Other embodiments may use state 508 in a high-power mode that allows the current to also be in a high state during voltage transitions.

These current and/or voltage ranges and requirements present a technical problem when it comes to powering the actuator 110 using the wired communication channel 162. Specifically, draining any power from the wired communication channel 162 would normally affect either the line current, the line voltage, or both. Interfering with any of these parameters may cause the boiler control 310 and/or the actuator 110 to misinterpret a communication signal, to detect a false communication signal, or to miss a communication signal altogether. For example, some communication protocols may use Manchester encoding or other binary encodings that detect signal transitions representing encoded binary data. Graph 521 illustrates an example of such encoding where high-to-low transitions are interpreted as a logical "1" and low-to-high transitions are interpreted as a logical "0". Assuming that the actuator 110 begins stealing power at time 522 in graph 521, this may cause the voltage level to decrease below a lower threshold of the communication protocol, which may in turn appeared to be a logical "0" to the boiler control 310. This may result in inadvertently activating or deactivating functions of the HVAC system 130, which may result in user discomfort, wasted energy, or other similar problems.

Additionally, graph 511 illustrates the timing requirements for rise and fall times of signals on the wired communication channel 162. In this example, a maximum rise time 512 and a maximum fall time 514 may be approximately 50 µs with a typical value of around 20 µs. Simply tacking on a traditional power stealing circuit to the wired communication channel 162 would necessarily add additional capacitance to the channel, which will necessarily affect the rise and fall times of signals on the wired communication channel 162. Transition times that take too long may cause the actuator 110 and/or the boiler control 310 to miss a signal transition. These requirements and considerations illustrate that any power-stealing circuit that is designed to steal power from the boiler control 312 over the wired communication channel 162 should not interfere with the communication signal levels or dynamic timing characteristics of a 2-wired communication protocol.

Figure 6:
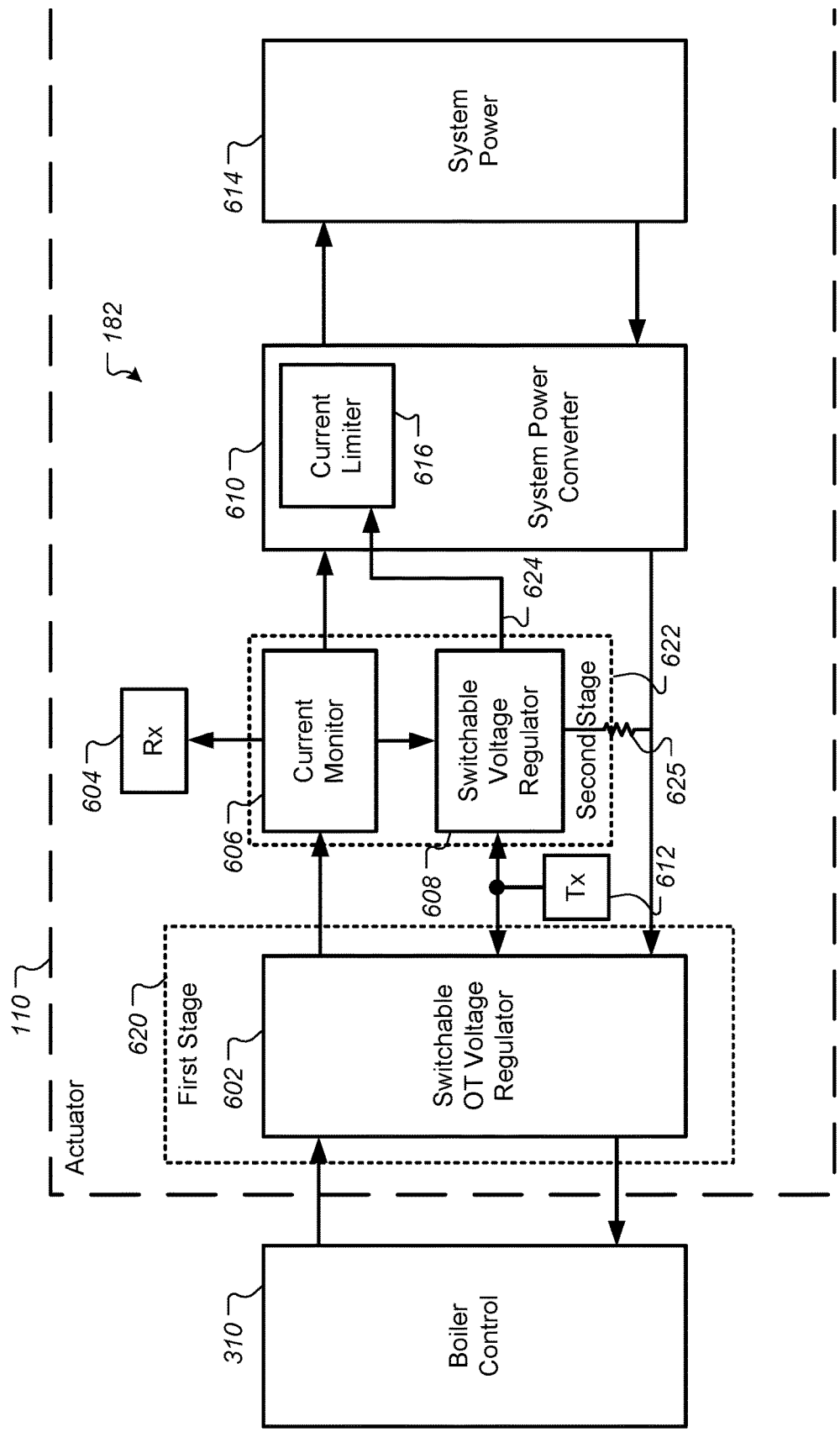
FIG. 6 illustrates a block diagram of a system for stealing power from a wired communication channel without interfering with a communication protocol, according to some embodiments.

The embodiments described herein solve these technical problems and improve the technologies of HVAC communication, device powering, discrete circuit design, battery charging, and low-power communication. These embodiments provide a method to supply a boiler control 310 (master) with power from an actuator or boiler control unit (slave), by maximizing its supplied current while providing master/slave communication without interfering with the chosen protocol. FIG. 6 illustrates a block diagram of a system for stealing power from a wired communication channel 162 without interfering with a communication protocol, according to some embodiments. This simplified block diagram illustrates the functions of different circuit blocks that can be implemented using a variety of different discrete circuit components, microcontrollers, and other digital/analog circuit elements. Some sample circuit implementations are also described in greater detail below.

The boiler controller 310 may be connected to the actuator 110 through a 2-wire connection using, for example, the OpenTherm communication protocol. Although the example of the boiler controller 310 is used for illustrative purposes in FIG. 6, other embodiments may extend to other types of systems. Therefore, the boiler control 310 may be replaced with any external system that communicates using a defined communication protocol where power is harvested or stolen from the communication wire connectors. The boiler control 310 may be replaced with any external system, such as an environmental system for controlling an environmental parameter, and other smart-home device, a smart appliance, a computer system, and electrical system, and so forth.

At a top level, some embodiments may be divided into a first stage 620 and the second stage 622. The first stage 620 may include a switchable OT voltage regulator 602 that acts as a voltage clamp. Specifically, the voltage regulator 602 of the first stage 620 can switch to multiple voltage levels while maintaining a constant current. For example, the voltage regulator 602 of the first stage 620 may support at least two—and in some embodiments more—different output voltage levels that can be programmed to correspond to the voltage level requirements of the particular communication protocol. An input from a controller on the actuator 110, such as a microprocessor or microcontroller, can provide a transmit input 612 to the voltage regulator 602. This transmit input 612 can be used to switch and/or control the voltage level output of the voltage regulator 602. Thus, the first state 620 can use the voltage regular 602 to translate the transmit input 612 to the appropriate voltage level required for the communication protocol. Additionally, the first stage 620 can feed the vast majority of the current received from the wired communication channel into the second stage 622. In some embodiments, the voltage regulator 602 of the first stage 620 may require just a fraction of the received current, in some cases as little as between 1 µA and 20 µA to maintain regulation. Additionally, the first stage 620 shields the voltage transitions of the voltage regulator 602 from the parasitic capacitance of the rest of the circuit that may be added in the subsequent discussion.

The power-stealing communication circuit 182 of the actuator 110 may additionally comprise a second stage 622 in some embodiments. The second stage 622 may include a current monitor circuit 606 and a second voltage regulator 608. The current monitor 606 can produce a signal proportional to the current received by the wired communication channel. This signal can be compared to thresholds that are defined according to the specification of the communication protocol, and the digital receive signal 604 can be routed to a controller for the actuator 110, such as a microprocessor or microcontroller to interpret the digital communication. In some embodiments, the current monitor 606 may include a resistor and a high-side current sense amplifier that is fed into an analog-to-digital converter (ADC) or one or more comparators to decode the received signal 604. The current can be measured effectively by clamping the voltage using the first voltage regulator 602 and ensuring that nearly all of the current received from the boiler control 310 is routed through the current monitor 606. In one example, a small resistance value (e.g., 1 ohm) can be placed in series between the first stage 620 and the second stage 622, and the resulting voltage drop across the small resistance value can be measured using the ADC/comparators to read the current value transmitted by the boiler control 310. Depending on the range of the current value, the current monitor 606 can generate a binary 0/1 encoding to be sent to or determined by the controller of the actuator 110. Placing the current monitor circuit 606 in the location depicted in FIG. 6 minimizes the current diverted from the measured signal. This also simplifies compensation with the comparison thresholds used to generate the receive signal 604.

Prior to this disclosure, diverting current for the power stealing function was very difficult to compensate for when generating the received signal 604 and sending a clear transmit signal 612 and led to communication interference. Specifically, stealing current away from the receive signal 604 to charge/power the actuator 110 would necessarily change the current of the received signal 604, possibly causing the processor of the actuator 110 to misinterpret the digital communication. To compensate for this, the second stage 622 may include a second voltage regulator 608 that provides the system power input and isolates the power stealing function from the communication function.

In some embodiments, the second voltage regulator 622 may either follow a scaled-down reference from the first stage 620 or the transmit input 612 can also be routed into the second voltage regulator 608 as an input. This allows the second voltage regulator 608 to know the operating voltage range of the first voltage regulator 602. This also allows the power-stealing communication circuit 182 to steal the maximum amount of power when the voltage level set by the first voltage regulator 602 switches to a higher voltage output.

Without providing this real-time feedback of the output voltage of the first voltage regulator 602, the second stage 622 would have to operate at a constant level compatible with the lowest voltage output, thereby wasting the increased power that could be stolen or fed into the system power converter during high voltage output intervals. Allowing the second stage regulator to track the first stage regulator maximizes the power output from the current monitor 606 into the system power converter 610, which maximizes the current stolen by the actuator 110 to power its internal systems and/or charge an energy storage element.

The system power converter 610 converts the output of the second stage 622 into a system voltage used by the actuator 110 as the system power 614. The system power converter 610 may include a voltage regulator that supports an input current limiter 616 that is controlled by the second voltage regulator 608 of the second stage 622 through a current limit output/signal 624. The current limit output/signal 624 may indicate a dropout condition in the second voltage regulator 608. When the second voltage regulator 608 enters a dropout condition where it can no longer provide a regulated output because the power converter 614 is stealing a maximum amount of current, the current limit signal 624 can cause the input current limit of the system power converter 610 to decrease, thereby relaxing the dropout condition. With enough load demand, the system power converter 610 will therefore always pull the maximum current amount out of the second stage 622, keeping the second regulator 608 operating at the edge of its dropout condition. Some embodiments may further include an energy storage circuit in the system power block 614 that can max out the load demand. For example, this energy storage circuit may include a charger for a secondary battery, a super capacitor, and/or the like.

Based on the design describe above, an input current that is varied by the boiler control 310 can be traced through the power-stealing communication circuit 182 depicted in FIG. 6. If the boiler control 310 increases the current on the wired communication channel, the first voltage regulator 602 can maintain the current transmit voltage and cause the additional current to flow into the current monitor 606 of the second stage 622. This also lifts the second voltage regulator 608 out of its dropout condition, thereby allowing the system power converter 610 to increase its current limit. This increase will continue until all of the available current feeds into the system power converter 610 and the second voltage regulator 608 again enters the dropout condition. The current limit signal 624 may reflect the current dropout state of the second voltage regulator, and the current limiter 616 of the system power converter 610 will adjust the input current pulled by the system power converter 610 accordingly. If the actuator 110 changes the voltage on the wired communication channel from, for example, a low voltage to a high voltage, this will change the output of the first stage 620 and the second stage 622 simultaneously. Consequently, the second voltage regulator 608 will enter its dropout condition, as it requires additional current to charge its input to the new target voltage. This in turn may reduce the input current of the system power converter 610 during this transient period.

If the system power converter 610 cannot consume all of the available current, the second stage 622 can sink any residual current after it flows through the current monitor 606 and the receive input 604 controls the proper current amount. For example, the second voltage regulator 608 can sink any residual current through a resistive pathway 625 to ground. Because this current is simply converted to heat, the embodiments described above provide a distinct technical advantage by limiting the amount of wasted current, unnecessary heat generation, and maximizing the power used by the actuator 110. Using both the first voltage regulator 602 and the second voltage regulator 608 also minimizes capacitance constraints. For example, the protection provided by the first voltage regulator 602 can allow a large input capacitance to be used on the system power converter 610 without slowing the rise/fall times that are mandated by the communication protocol.

Figure 7:
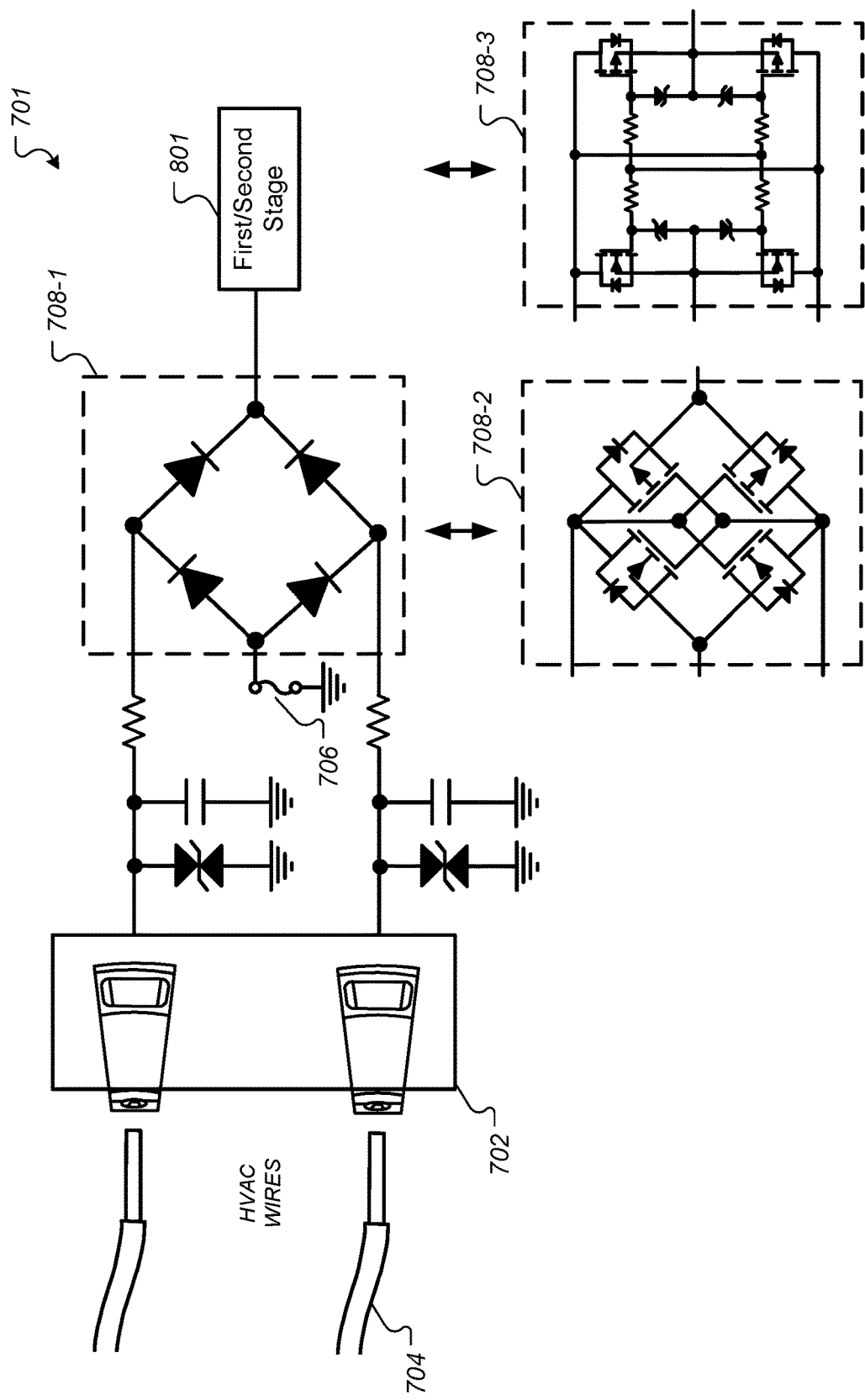
FIG. 7 illustrates a circuit-level implementation of an input circuit, according to some embodiments.

FIG. 7 illustrates a circuit-level implementation of an input circuit, according to some embodiments. In this implementation, a two-wire protocol can be used, and the current/voltage signals can be transmitted across a pair of HVAC wires 704 that run between the boiler control 310 and the actuator 110. The HVAC wires 704 may be polarity-agnostic wires connected to an input port on the actuator 110. The input port 702 may include a plurality of wiring connectors that are configured to receive a plurality of wires. Any type of physical wiring connector may be used. Once received, the signals from the wires 704 can be run through a bridge rectifier 708 to rectify the signal. In some embodiments, a diode bridge rectifier 708-1 may be used. In some embodiments, a FET bridge rectifier 708-2 may instead be used. The FET bridge rectifier 708-2 may result in more efficient power stealing by removing the diode voltage drops from the diode bridge rectifier 708-1. The FET bridge rectifier 708-2 may work with voltages below the $V_{gs(max)}$ of the FETs. For voltages that are likely to exceed the $V_{gs(max)}$ of the FETs, the FET $V_{gs}$ can be clamped to prevent damage the FETs using the Zener-resistor network to clamp the gates and sources of the FETs in the alternate FET bridge rectifier 708-3. Some embodiments may also include a fuse 706 to protect against over-current anomalies. The resulting signal in the circuit in FIG. 7 is fed into the first/second stage 801 of the circuit described below.

Figure 8:
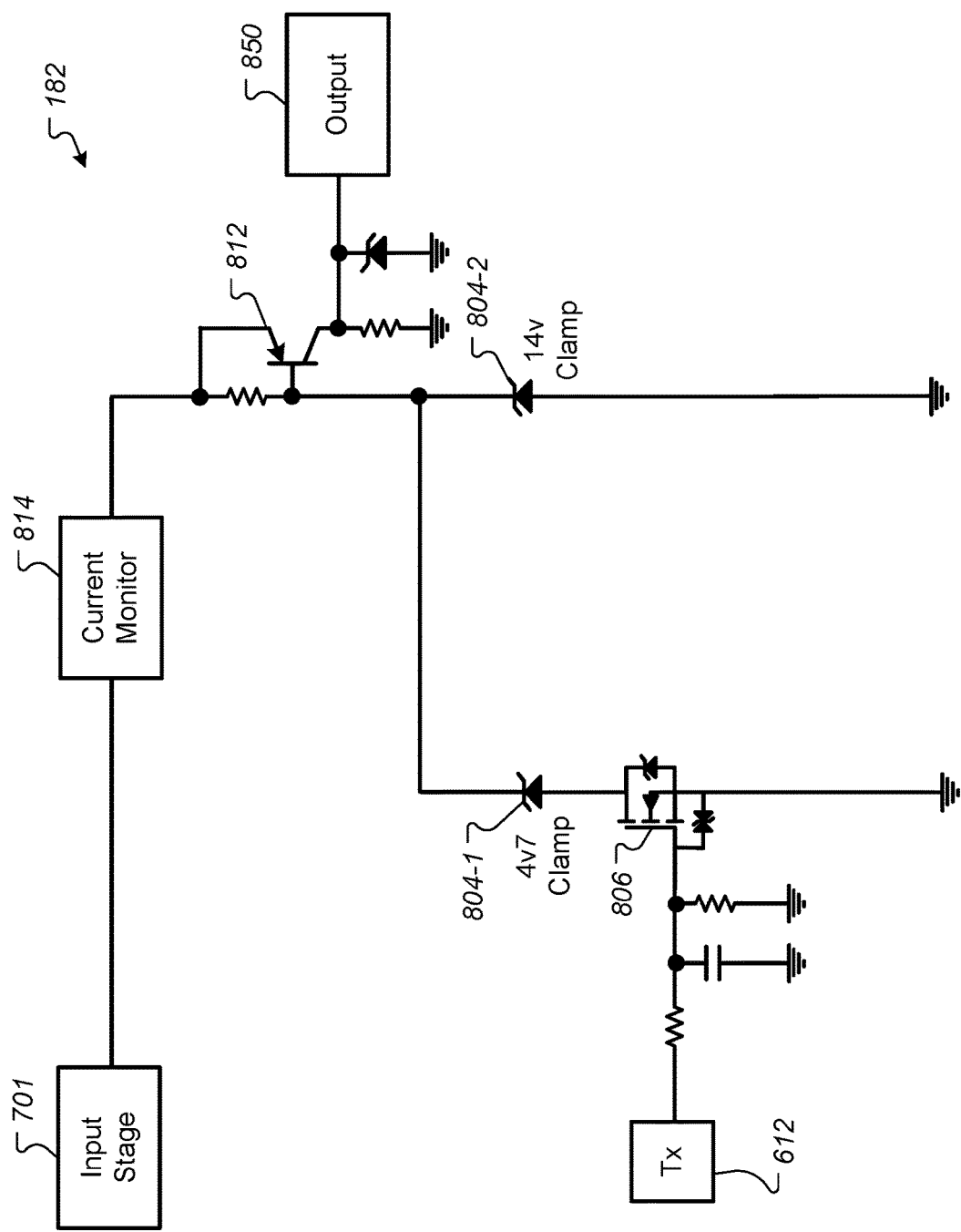
FIG. 8 illustrates a circuit-level implementation of a first power stealing communication circuit, according to some embodiments.

FIG. 8 illustrates a circuit-level implementation of a first power stealing communication circuit 182, according to some embodiments. The input 701 from the circuit of FIG. 7 can first be fed into a current monitor 814 that will be described in greater detail below in FIG. 9. The first voltage regulator of the first stage described above can be implemented using a pair of Zener diode clamps 804. A first diode clamps 804-1 can be selected to be within the lower voltage range of the communication protocol (e.g., less than 8 V for OpenTherm), and a second diode clamp 804-2 can be selected to be within the upper voltage range of the communication protocol. The diode clamp to be activated can be selected using the transmit control 612 provided from the processor of the actuator 110.

A transistor 812 can act as a shunt regulator that is controlled by the voltage dictated by the Zener diode clamps 804. The output 850 is sent to a low-dropout (LDO) voltage regulator to generate the regulated voltage necessary for the microprocessor to run (e.g., 1.8 V). The first and second stage voltage regulators from FIG. 6 can be implemented as shunt regulators using the PNP bipolar transistor 812 and the selected Zener diode clamps 804 for base voltage regulation. The dropout voltage signal for an input-current regulated DC/DC converter can be generated by a shunt resistor in the collector path of the transistor 812 of the second stage. For both voltage regulators, the Zener diodes 804 can be switched according to the transmit input 612 to provide the correct input voltage supply levels. This embodiment does not require a secondary DC/DC converter. Instead, the LDO described below has a very low current output by design to ensure that the clamps 804 are able to continuously regulate voltage.

In some embodiments, a low-power microcontroller can also be included within the power domain of the power stealing circuit. This low-power microcontroller can have an operating current of less than 2 mA. This low level of power usage ensures that the low-power microcontroller will always operate below the current threshold of the communication protocol. Therefore, the low-power microcontroller can always be guaranteed operate so long as the boiler control 310 provides a current signal to the actuator 110. The low-power microcontroller can monitor the power stealing circuitry and provide keep alive messages for the communication channel. Some embodiments may also provide an alternate power path that bypasses the circuit described above in FIG. 8 to provide auxiliary power when not receiving a current from the boiler control 310. For example, the actuator 110 may include backup batteries and/or a USB interface that can be used to provide external or auxiliary power in addition to the power stolen from the boiler control 310.

Figure 9:
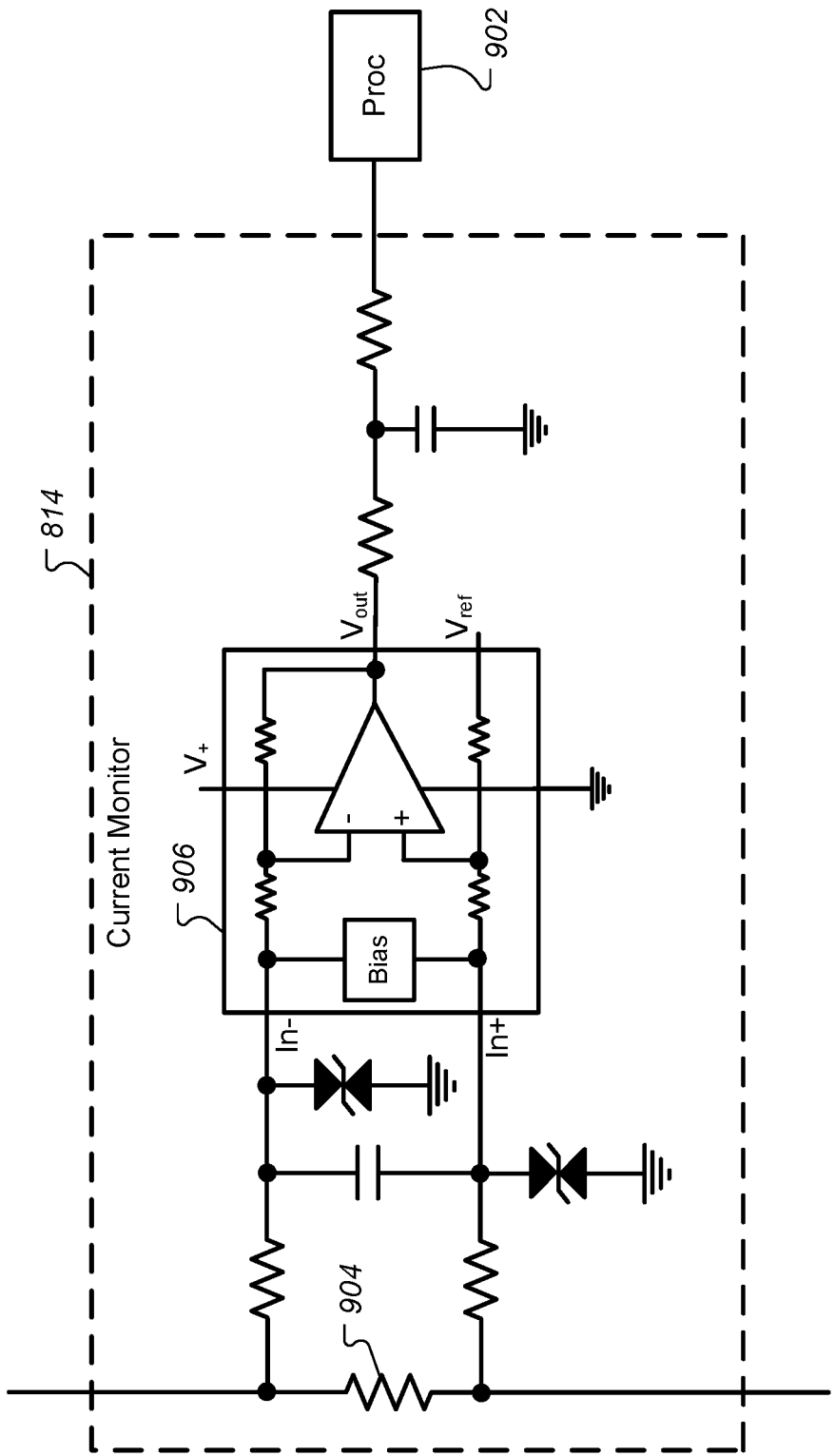
FIG. 9 illustrates a circuit-level implementation of the current monitor circuit, according to some embodiments.

FIG. 9 illustrates a circuit-level implementation of the current monitor circuit 814, according to some embodiments. The current monitor 814 may include a resistor 904 (e.g., 1 ohm) through which the input current flows in series. The value of the resistor 904 should be selected to be a relatively small value such that only a small amount of voltage drop budget is used by the current monitor 814. In this embodiment, a current-sense amplifier 906 can be used to provide precision current measurement, the output of which can be sent to the microcontroller 902 for the actuator 110. The voltage differential across the resistor 904 can be fed as positive and negative inputs into the current-sense amplifier 906. The amplified signal can then be sent to an onboard ADC on the processor 902 and decoded to read the binary data encoded in the current flowing into the actuator 110. In other embodiments, the signal can be decoded before reaching the processor 902 using voltage references and/or comparator circuits. Depending on the particular communication protocol used, the processor 902 can then detect level transitions (e.g., between 9 mA and 17 mA) to decode the binary data.

Figure 10:
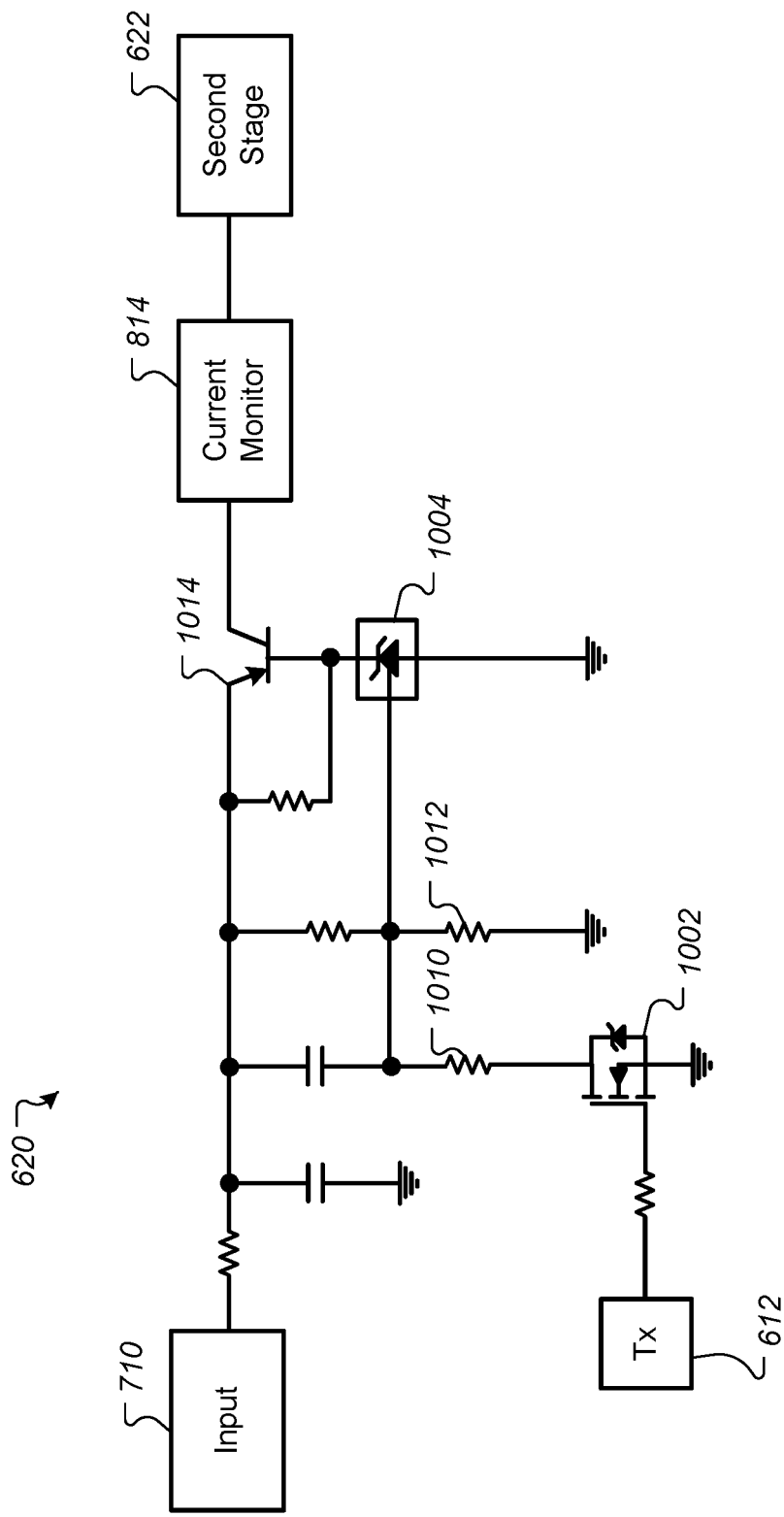
FIG. 10 illustrates a circuit-level implementation of a first stage of a power stealing communication circuit, according to some embodiments.

FIG. 10 illustrates a circuit-level implementation of a first stage of a power stealing communication circuit 182, according to some embodiments. This circuit may correspond to the first stage 620 depicted in FIG. 6 above. The input 710 may be received from the input circuit of FIG. 7. The first stage 620 can be implemented using a low-voltage, adjustable precision shunt regulator 1004, such as the TLV431x available from Texas Instruments®. This shunt regulator provides a 3-terminal adjustable voltage reference with a selectable input. The regulator 1004 can drive a bipolar transistor 1014 to implement the regulation function. The regulated voltage can be selected using the transmit input 612 from the microcontroller. The transmit input 612 can be used to drive a FET 1002. When the FET 1002 is off, the voltage divider using resistor 1012 will determine the voltage for the regulator 1004. When the FET is on, the voltage divider may then connect resistor 1010 in parallel with resistor 1012, changing the value of the voltage divider, and changing the value of the voltage regulated by the regulator 1004. The values for resistor 1010 and resistor 1012 can be selected based on the desired voltage and the particular brand of regulator 1004 used in the circuit. The output from the first stage 620 can be fed into the current monitor 814 depicted above in FIG. 8, and then fed into a second stage 622 described below.

Figure 11:
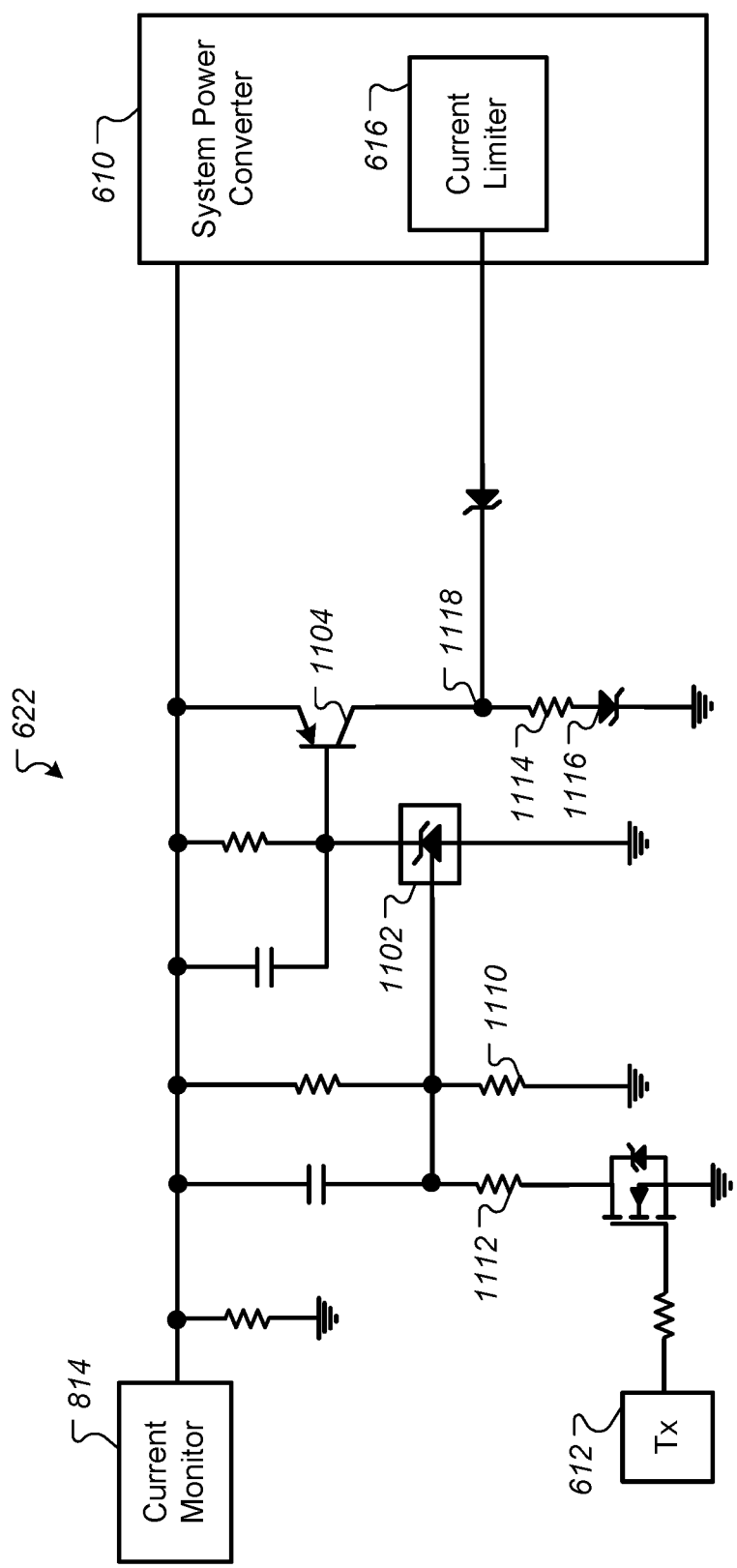
FIG. 11 illustrates a circuit-level implementation of a second stage of a power stealing communication circuit, according to some embodiments.

FIG. 11 illustrates a circuit-level implementation of a second stage of a power stealing communication circuit 182, according to some embodiments. This circuit may correspond to the second stage 622 depicted in FIG. 6 above. A second low-voltage, adjustable precision shunt regulator 1102 may also be included in the second stage 622. This regulator 1102 operates in much the same fashion as the first shunt regulator 1004 in FIG. 10. For example, the transmit input 612 can selectively connect a resistor 1112 in parallel with a second resistor 1110 to adjust feedback to the regulator 1102 and control its output. When the transmit input 612 is in a first state, the voltage divider includes only resistor 1110, while when the transmit input 612 is in a second state, the voltage divider includes resistor 1110 in parallel with resistor 1112. This allows the second stage 622 to follow the first stage 620 simultaneously when the transmit input 612 changes.

During operation, the load output of the current monitor 814 will initially go high. This will raise the voltage on the top input of the regulator 1102 and of the transistor 1104, causing the transistor 1104 to begin conducting. When the transistor 1104 begins conducting, most of the current received from the current monitor 814 will be shunted through the shunt resistor 1114. As the current through the shunt resistor 1114 increases, the voltage at node 1118 will increase. Note some embodiments may include a diode 1116 to add a minimum voltage drop at node 1118. The voltage at node 1118 is fed into the current limiter 616 of the system power converter 610. As will be described below, as this input to the current limiter 616 increases, the system power converter 610 will increase the amount of current it steals from the second stage 622. Specifically, the system power converter 610 will continue increasing the amount of current that it steals until the voltage at node 1118 begins to decrease.

When a maximum amount of power is stolen from the second stage 622 by the system power converter 610, the regulator 1102 will begin to drop out and no longer regulate a voltage sufficient to cause the transistor 1104 to conduct. As the transistor 1104 stops conducting (i.e., drops out), the voltage on node 1118 sent to the current limiter 616 will drop. This in turn will cause the current limiter 616 to decrease the amount of current stolen by the system power converter 610. As the current stolen by the system power converter 610 decreases, the regulator 1102 will come out of its dropout mode and again regulate a voltage to cause the transistor 1104 to conduct. This will again cause the voltage on node 1118 to rise, and allow the system power converter 610 to increase the amount of current it pulls at its input. This cycle will continue, keeping the regulator 1102 operating on the edge of its dropout mode. This forms a feedback loop that ensures that the system power converter 610 steals as much power as possible from the second stage 622 without affecting the current/voltage used in the 2-wired communication protocol. This feedback loop process may also be referred to as optimizing an amount of power stolen, where the stolen power can be used to power the actuator and/or charge a rechargeable energy device.

Figure 12:
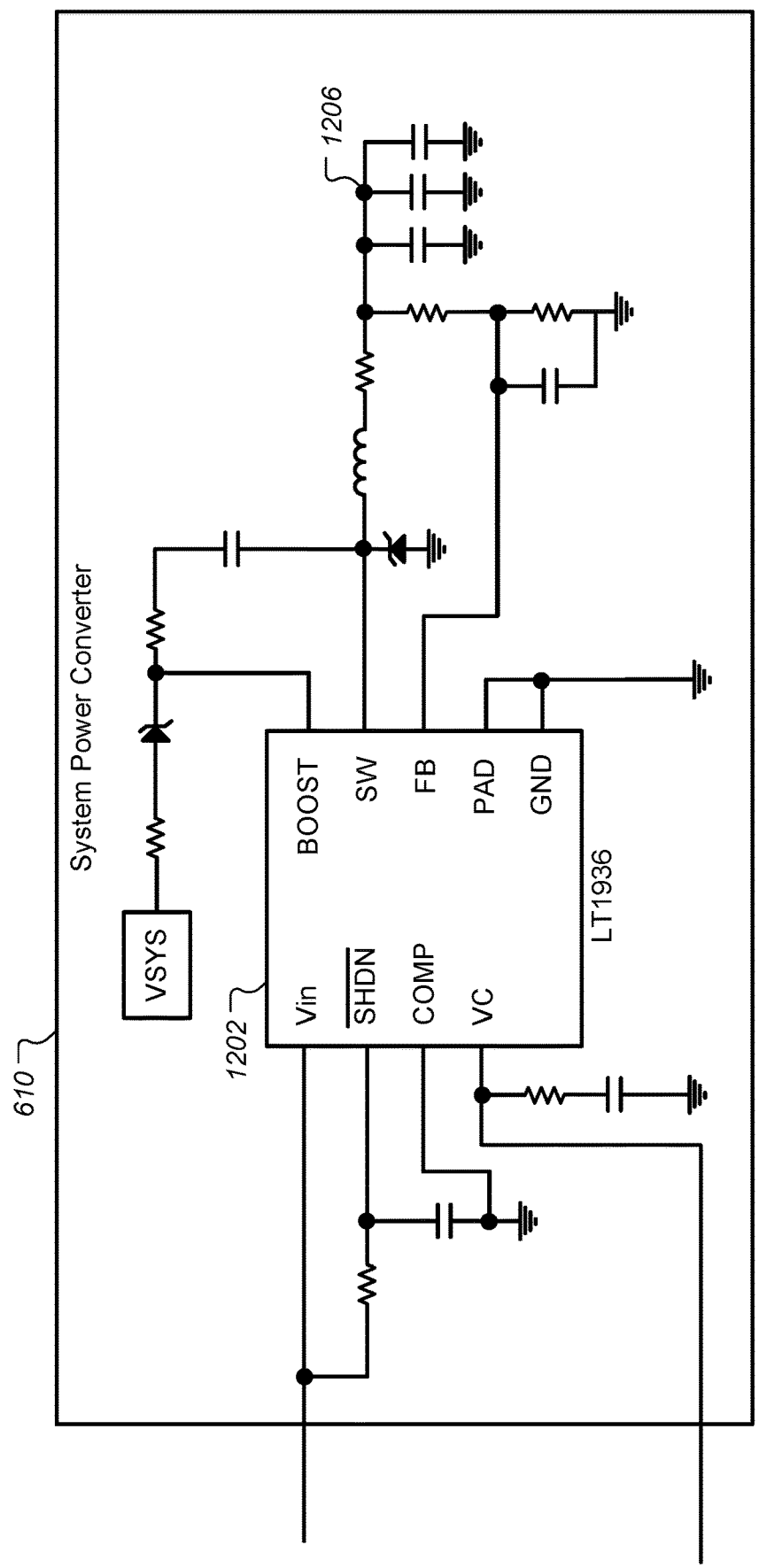
FIG. 12 illustrates a simplified circuit diagram of the system power converter, according to some embodiments.

FIG. 12 illustrates a simplified circuit diagram of the system power converter 610, according to some embodiments. The system power converter 610 may use a PWM step-down DC/DC converter 1202, such as LT1936 from Linear Technology®. The Vin input can deliver the current from the second stage 622 to the internal regulator of the converter 1202. The SHDN pin may be used to put the converter 1202 into a shutdown mode. This feature can be disabled by tying the SHDN pin to the Vin pin. Similarly, the COMP can deactivate an internal compensation network by tying the COMP pin to GND. The VC pin is used to compensate the control loop of the converter 1202 by tying an external RC network from this pin to GND. An amplifier and comparator monitor the current flowing between the Vin and SW pins, turning the switch off when this current reaches a level determined by the voltage at the VC pin. An error amplifier measures the output voltage through an external resistor divider tied to the FB pin and servos the VC pin. If the error amplifier's output increases, more current is delivered to the output; if it decreases, less current is delivered. Thus, connecting the feedback loop from the second stage 622 to the VC pin of the converter 1202 in the system power converter 610 can control the amount of current pulled by the Vin input of the converter 1202. The bank of capacitors 1206 represents the power output that can be sent to the rest of the actuator system.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A circuit for stealing power from an external system without interfering with a communication protocol, the circuit comprising:
    a plurality of wiring connectors configured to receive a plurality of wires, wherein the plurality of wiring connectors receive a plurality of current levels set by the external system according to the communication protocol;
    a first voltage regulator to regulate a voltage on the plurality of wiring connectors at a plurality of voltage levels according to the communication protocol to encode a first multi-bit binary message to be sent to the external system in the plurality of voltage levels;
    a current monitor to measure the plurality of current levels received through the plurality of wiring connectors and decode the plurality of current levels to determine a second multi-bit binary message sent from the external system;
    a second voltage regulator that provides a current-limiting output; and a power converter that optimizes an amount of power stolen from the plurality of wiring connectors based on the current-limiting output.

2. The circuit of claim 1, further comprising a bridge rectifier coupled between the plurality of wiring connectors and the first voltage regulator.

3. The circuit of claim 2, wherein the bridge rectifier comprises a diode bridge rectifier.

4. The circuit of claim 2, wherein the bridge rectifier comprises a FET bridge rectifier with Zener-resistor clamps at FET gates.

5. The circuit of claim 1, wherein the first voltage regulator comprises a plurality of Zener diode clamps, wherein regulated voltages of the plurality of Zener diode clamps correspond to the plurality of voltage levels.

6. The circuit of claim 1, wherein the current monitor comprises a resistor and a current-sense amplifier that measures a voltage differential across the resistor.

7. The circuit of claim 1, further comprising a resistive network coupled to the first voltage regulator and a switch controlled by a transmit signal from a processor, wherein the switch changes a resistance of the resistive network to control a regulated voltage output by the first voltage regulator.

8. The circuit of claim 1, further comprising a resistive network coupled to the second voltage regulator and a switch controlled by a transmit signal from a processor, wherein the switch changes a resistance of the resistive network to control a regulated voltage output by the second voltage regulator.

9. The circuit of claim 1, wherein the power converter comprises an error amplifier that controls an output current of the power converter.

10. The circuit of claim 1, wherein the current-limiting output from the second voltage regulator drops in voltage when the second voltage regulator drops out, thereby causing the power converter to use less current.

11. A method for stealing power from an external system without interfering with a communication protocol, the method comprising:

receiving a plurality of current levels set by the external system according to the communication protocol, wherein the plurality of current levels are received through a plurality of wiring connectors configured to receive a plurality of wires;

regulating a voltage on the plurality of wiring connectors at a plurality of voltage levels according to the communication protocol using a first voltage regulator to encode a first multi-bit binary message to be sent to the external system in the plurality of voltage levels;

measuring the plurality of current levels received through the plurality of wiring connectors using a current monitor to decode the plurality of current levels to determine a second multi-bit binary message sent from the external system;

providing a current-limiting output from a second voltage regulator; and optimizing an amount of power stolen from the plurality of wiring connectors by a power converter based on the current-limiting output.

12. The method of claim 11, wherein optimizing the amount of power stolen comprises reducing an amount of power output by the power converter when the current-limiting output indicates that the second voltage regulator is dropping out.

13. The method of claim 11, wherein optimizing the amount of power stolen comprises increasing an amount of power output by the power converter when the current-limiting output indicates that the second voltage regulator is not dropping out.

14. The method of claim 11, further comprising receiving a command from a smart-home device to send the first multi-bit binary message to the external system.

15. The method of claim 11, wherein the first voltage regulator comprises a precision shunt regulator.

16. The method of claim 11, further comprising using the power stolen by the power converter to power a system processor.

17. The method of claim 11, further comprising using the power stolen by the power converter to charge a rechargeable energy-storage device.

18. The method of claim 11, wherein the external system comprises an HVAC system comprising a boiler.

* * * * *